July 3, 1962

H. AUDINO 3,042,356

VACUUM HOLD-DOWN APPARATUS

Filed Jan. 25, 1960

INVENTOR
*HECTOR AUDINO*
BY *Theodore Jayne*
ATTORNEY

United States Patent Office 3,042,356
Patented July 3, 1962

3,042,356
VACUUM HOLD-DOWN APPARATUS
Hector Audino, 102 Bennett Road, Teaneck, N.J.
Filed Jan. 25, 1960, Ser. No. 4,557
2 Claims. (Cl. 248—363)

My invention relates to vacuum hold-down apparatus.

In order to print patterns on non-porous sheets, as required for example in applying printed descriptive or advertising matter to paper or cardboard sheets, it is often necessary to hold such sheets firmly in position on a flat supporting member prior to the printing operation. Conventionally, the sheets are held in position by suction forces which are applied and released as necessary. Various types of vacuum hold-down apparatus are used for this purpose.

It is an object of my invention to provide a new type of vacuum hold-down apparatus in which the speed both of application and release of suction forces is substantially increased over that heretofore obtainable, thus permitting increased speed in processing non-porous sheets.

Another object is to provide a new type of vacuum hold-down apparatus which, in contradistinction to known apparatus, employs a metal top which prevents build up of static charges when processing plastic sheets and other static-prone materials.

Still another object is to provide a new type of vacuum hold-down apparatus in which the flow of moving air (produced during both the application and the release of suction forces) does not come into substantial contact with a rigid supporting structure, such as plywood, thus preventing warpage.

A further object is to provide a new type of vacuum hold-down apparatus which is solid and will not give during the application or release of suction forces and is resistant to indentation.

Still a further object is to provide a new type of vacuum hold-down apparatus which can be easily manufactured at low cost.

These and other objects of my invention will either be explained or will become apparent hereinafter.

In accordance with the principles of my invention, I provide a thin metal plate having a perforated surface. Positioned under the plate is a flexible mat provided with a flat bottom surface and a corrugated top surface having lands and valleys, the lands being substantially out of registration with the perforations in the plate. The flexible mat is further provided with at least one slot which extends through the entire thickness of the mat. A rigid supporting member is positioned under the flexible mat, this member having at least one orifice in registration with the slot or slots of the mat. The mat, the plate and the member are tightly drawn together, the periphery of the resulting structure being sealed to prevent air intake.

Suction producing means, such as a vacuum blower, is coupled through a vacuum control valve to the orifice in the supporting member.

With the valve in the open position, a non-porous sheet is placed upon the perforated surface of the metal plate. Air is then exhausted from the under surface of the sheet through the perforations of the metal plate; this air is then carried along the valleys of the mat to the openings therein. Finally, the air then passes through the orifice of the supporting member and is ultimately released to the atmosphere through the suction means.

The suction pressure is only slightly below atmospheric pressure. The total air containing volume of the structure to be exhausted is small. Hence, no vacuum reservoir is required and the suction forces can be rapidly applied or released by opening or closing the valve.

An illustrative embodiment of my invention will now be explained with reference to the accompanying drawings wherein.

Figure 1:
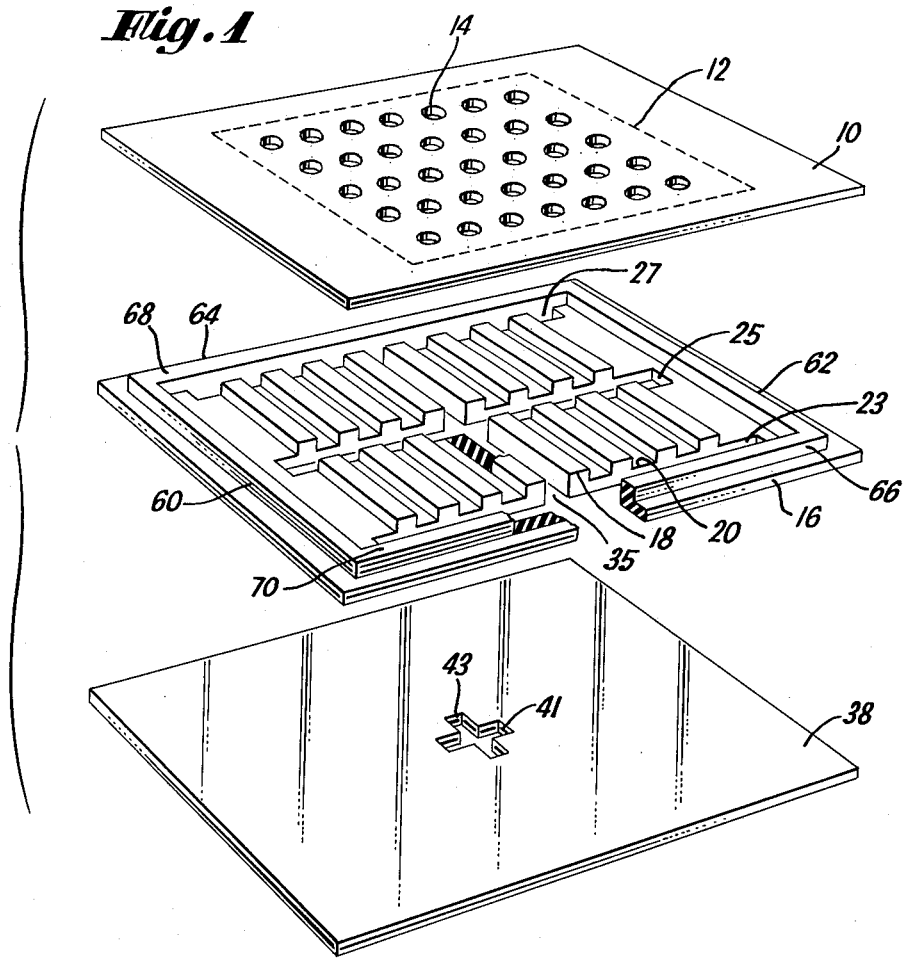
FIG. 1 is an isometric view of one embodiment of my invention.
Figure 2:
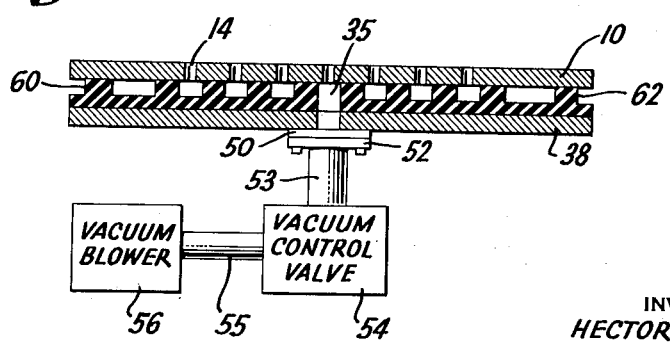
FIG. 2 is a cross sectional view of the device of FIG. 1.

Referring now to the drawings, a thin metal plate 10 is formed, for example, of aluminum and provided with a perforated area defined by the rectangle 12. This area is perforated with a plurality of holes 14. (The ratio of the free area represented by the holes to the total area of the rectangle 12 is small, ranging for example between 5 to 15%.) Typically, for an aluminum thickness of about .09 inch, these holes can be .05–.07 inch in diameter. For stainless steel the thickness can be .03 inch or less.

A corrugdated flexible mat 16 is positioned underneath plate 10, the top surface of mat 16 having lands 18 and valleys 20. The lands 18 of mat 16 are substantially out of registration with the holes 14. This is accomplished by insuring that the hole spacing is not an integral multiple of the corrugation spacing. (For example, when the spacing between lands is 0.125 inch, I have found that a useful hole spacing is 0.5625 inch.)

The mat itself can be formed from rubber. A typical thickness can be 0.125 inch, the depth of the valleys being about 0.060 inch.

The mat is provided with a plurality of openings or channels, in this example slots 23, 25, and 27, which extend transversely to the corrugations and slot 35 which extends parallel to the corrugations. The width of the channels can be, for example, from ½ inch to 1½ inches, depending upon the mat thickness.

Positioned below the mat 16 is a rigid supporting member 38 formed, for example, from ¾ inch thick plywood.

Member 38 is provided with two mutually orthogonal slots 41 and 43 which intersect each other and which are in registration with corresponding portions of slots 25 and 35. Each of slots 41 and 43 can be, for example, ½ inch wide by 3 and ½ inches long.

During fabrication, plate 10, mat 16 and member 38 are drawn and secured tightly together by the application of vacuum pressure during the setting of selectively glued areas.

A gasket 50 formed, for example, of ⅛ inch thick rubber is secured to the underside of member 38 concentric to slots 41 and 43. A pipe flange 52, for example a 2 inch flange, is positioned below the gasket. A vacuum pipe 53, for example a 2 inch pipe, connects the flange through a vacuum control valve 54 and a flexible hose 55 to a vacuum pump or blower 56.

When a paper sheet is placed upon rectangle 12, and the valve 54 is open, a suction force slightly below atmospheric pressure, for example a pressure of about 1 pound below atmospheric pressure, is applied to the underside of the sheet.

The periphery of the structure formed by the plate 10, the mat 16 and the member 38, is sealed to prevent leakage. The edges 60 and 62 of this structure which are parallel to the corrugations of mat 16 are self-sealing by virtue of the corrugations themselves. The other edges 64 and 66 can be sealed as shown in FIG. 1 by using abutting pieces 68 and 70 of the corrugated mat with the corrugations oriented parallel to these edges. (Alternatively, these edges can be sealed by using a metal molding mechanically secured to the supporting member and tightly drawn against a rubber gasket.)

With suction forces applied to the bottom surface of the sheet, air is withdrawn from this under surface. This air then passes through holes 14, the corrugations of the mat 16, through channels 23, 25 and 27 of mat 16, through the slots 41 and 43 of member 38, through the pipe 53, valve 54, flexible hose 55, and is ultimately exhausted to the atmosphere through the blower 56.

It will be noted that the flowing air and atmosphere do not come into substantial contact with member 38 and hence, in the case of plywood or other cellulosic materials, the member 38 will not warp.

Since the total volume of the structure through which the exhausted air is to flow is small, the suction forces can be rapidly applied and released. The speed of release can be further increased by deliberately introducing air leakage paths in the structure, as for example, by providing one or more points of leakage to the atmosphere in the gasket 50.

The number of slots shown in the rubber mat 16 are useful when the metal plate 10 is relatively large, for example, 48 inches by 62 inches. When the plate 10 is smaller, all these slots are not needed and indeed, all slots, but 25, can be eliminated. Further slots 41 and 43 can be replaced by a single opening.

Further, each slot may be replaced by a plurality of closely spaced holes which are aligned in a row, the diameter of the holes being essentially equal to the width of the slot, the row of holes extending in the same direction as the slot.

The top surface of the structure, being metal, can be grounded to avoid accumulation of static electric charges.

When the metal plate is sufficiently thick to remain flat (i.e. not bent) under vacuum forces, then each land of the mat 16 can be replaced by a row of separated supporting centers such as rubber dimples or buttons which are integral with the mat. These centers can have the same depth as the lands and for example can have a circular or rectangular cross-section. Alternatively, separate supporting centers can be used without a mat. The supporting centers should be so shaped and positioned as to minimize any blocking of the perforations. When separate supporting members are used without a mat, the supporting surface should be resistant to water vapors.

While I have shown and pointed out my invention as applied above, it will be apparent to those skilled in the art that many modifications can be made within the scope and sphere of my invention, as defined in the claims which follow.

What is claimed is:

1. Vacuum hold-down apparatus comprising a thin perforated non-porous metal plate; a flexible mat positioned under said plate, said mat having a corrugated upper surface and a flat lower surface, said upper surface having lands and valleys, said valleys being in registration with the perforations in said plate, said mat having a first channel which extends transversely to said lands and a second channel extending parallel to said lands and intersecting said first channel; and a rigid supporting member positioned under said mat and having first and second short intersecting slots which in the region of intersection of said channels are in registration with said first and second channels respectively.

2. Vacuum hold-down apparatus as set forth in claim 1 wherein said mat further includes third and fourth channels which extend parallel to said first channel on opposite sides thereof, each of said third and fourth channel intersecting said second channel in different positions.

References Cited in the file of this patent

UNITED STATES PATENTS

| | | |
|---|---|---|
| 627,069 | Baker | June 13, 1899 |
| 1,234,416 | Sweigard | July 24, 1917 |
| 2,317,348 | Wekeman | Apr. 24, 1943 |
| 2,645,153 | Halpern | July 14, 1953 |
| 2,895,706 | Blatherwick | July 21, 1959 |
| 2,910,265 | Anander | Oct. 27, 1959 |